United States Patent
Addy

(10) Patent No.: US 7,836,209 B2
(45) Date of Patent: Nov. 16, 2010

(54) REAL TIME CONTROL AND MANAGEMENT OF SECURITY "BUDDY" SYSTEM OVER MSO LAN

(75) Inventor: Kenneth L. Addy, Massapequa, NY (US)

(73) Assignee: Honeywell International Inc., Morristown, NJ (US)

( * ) Notice: Subject to any disclaimer, the term of this patent is extended or adjusted under 35 U.S.C. 154(b) by 376 days.

(21) Appl. No.: 12/058,887

(22) Filed: Mar. 31, 2008

(65) Prior Publication Data

US 2009/0248853 A1   Oct. 1, 2009

(51) Int. Cl.
*G06F 13/00* (2006.01)
(52) U.S. Cl. .................. 709/250; 709/218; 709/224; 726/26
(58) Field of Classification Search ............. 709/217, 709/218, 219, 223, 224, 250; 726/26
See application file for complete search history.

(56) References Cited

U.S. PATENT DOCUMENTS

| | | | |
|---|---|---|---|
| 7,183,907 B2 * | 2/2007 | Simon et al. ............ | 340/531 |
| 7,449,999 B2 * | 11/2008 | Hevia et al. ............ | 340/531 |
| 7,669,054 B2 * | 2/2010 | Fox ........................ | 713/172 |
| 2006/0092011 A1 * | 5/2006 | Simon et al. ............ | 340/521 |

* cited by examiner

*Primary Examiner*—Viet Vu
(74) *Attorney, Agent, or Firm*—Husch Blackwell LLP Welsh Katz

(57) ABSTRACT

An inventive system and method for a buddy security system is presented. The system and method enable the buddy security system in which messages can be exchanged between two distinct security systems. The inventive system is operable on a network having dynamic IP addresses using a centralized database of real time IP addresses. An MSO maintains the centralized database including basic information for connecting the control panels of the security systems to each other. The first and second security systems each have a control panel having a dynamic IP address; the control panel of the second system provides information to and can be controlled by the control panel of the first system. The dynamically IP address of each control panel is obtained from the centralized database.

14 Claims, 3 Drawing Sheets

REAL TIME CONTROL AND MANAGEMENT OF SECURITY "BUDDY" SYSTEM OVER MSO LAN

FIELD OF THE INVENTION

This invention relates generally to security systems. In particular, this invention relates to real time control and management of security systems over MSO LAN.

BACKGROUND OF THE INVENTION

Security and asset management systems are used to monitor homes and businesses to prevent unwanted intrusions as well as to guard against natural disasters. Such systems can include one or more security control panels, or security panels, located throughout the secured area. In addition to physical security panels, the system can be partitioned into virtual partitions, enabling distinct portions of a space or secured area in a secured structure to be separately monitored and/or protected.

To transport messages both within a secured area and between the secured area and a central monitoring station, security systems can employ the internet. Typically, the security panel has an Ethernet connection, either via a gateway or directly, so the panel eventually connects to a router in the secured structure. Accordingly, the system's security panel can exchange alarms and/or other information over the internet with a central monitoring station. In addition, security systems can communicate between security panels and/or between "virtual" partitions within the secured structure using various communication means. Connectivity between partitions is generally via the proprietary buses.

Use of internet connectivity reveals that dynamic IP addresses are troublesome for the security industry. A central monitoring station requires a security panel's IF address to download information to the panel. If the panel's address is a dynamic IP address, then the central monitoring system has no knowledge of the panel's active IP address.

A multi-service operator (MSO) offers multiple services to consumers, such as internet service, telephone service, television and/or cable broadcasts. An MSO generally operates its system as a local area network (LAN) with dynamic host configuration protocol (DHCP) allocating dynamic IP addresses to its internet customers. Accordingly, an MSO maintains a real time mapping of dynamic IP addresses to physical addresses and names; this mapping changes as the dynamic IP addresses change. Generally this mapping is maintained in a data table or database. Among their internet service offerings, MSOs do not include services for securing physical premises.

Thus there is a need for a security system able to secure physical premises, and able to communicate with its security panels and partitions and with a central station as well as with another, "buddy" security system, over the internet, where both security systems have dynamic IP addresses.

SUMMARY OF THE INVENTION

The present invention advantageously enables a buddy security system in which messages can be exchanged between two distinct security systems. The inventive system is operable on a network having dynamic IP addresses using a centralized database of real time IP addresses. An MSO maintains the centralized database including basic information for connecting control panels to each other.

An inventive system and method for a buddy security system is presented. The system and method comprise a security system central station, an MSO having an MSO LAN and a central office having a data table comprising a plurality of IP addresses, a standard control panel in a first security system, the standard control panel having a first IP address of the plurality of IP addresses and being operable to communicate with the central station and the central office via the MSO LAN, and a buddy control panel in a second security system distinct from the first security system, the buddy control panel having a second IP address of the plurality of IP addresses and being operable to communicate with the central station and the central office via the MSO LAN, wherein the standard control panel and the buddy control panel communicate using the first and the second IP addresses obtained from the data table.

Several embodiments can exist individually or in combination. In one embodiment, when an event occurs in the second security system, the event is displayed on the buddy control panel and on the standard control panel using the first IP address obtained from the data table. In one embodiment, the buddy control panel and the standard control panel have Ethernet connections. In one embodiment, when the event occurs, the second security system notifies the central station. In one embodiment, the event is displayed as audio, video, and/or text data, and/or the event is displayed in real time on the user interface of the standard control panel. In one embodiment, the standard control panel comprises a buddy partition operable to display the event.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown.

In the drawings.

DETAILED DESCRIPTION OF THE INVENTION

Figure 1:
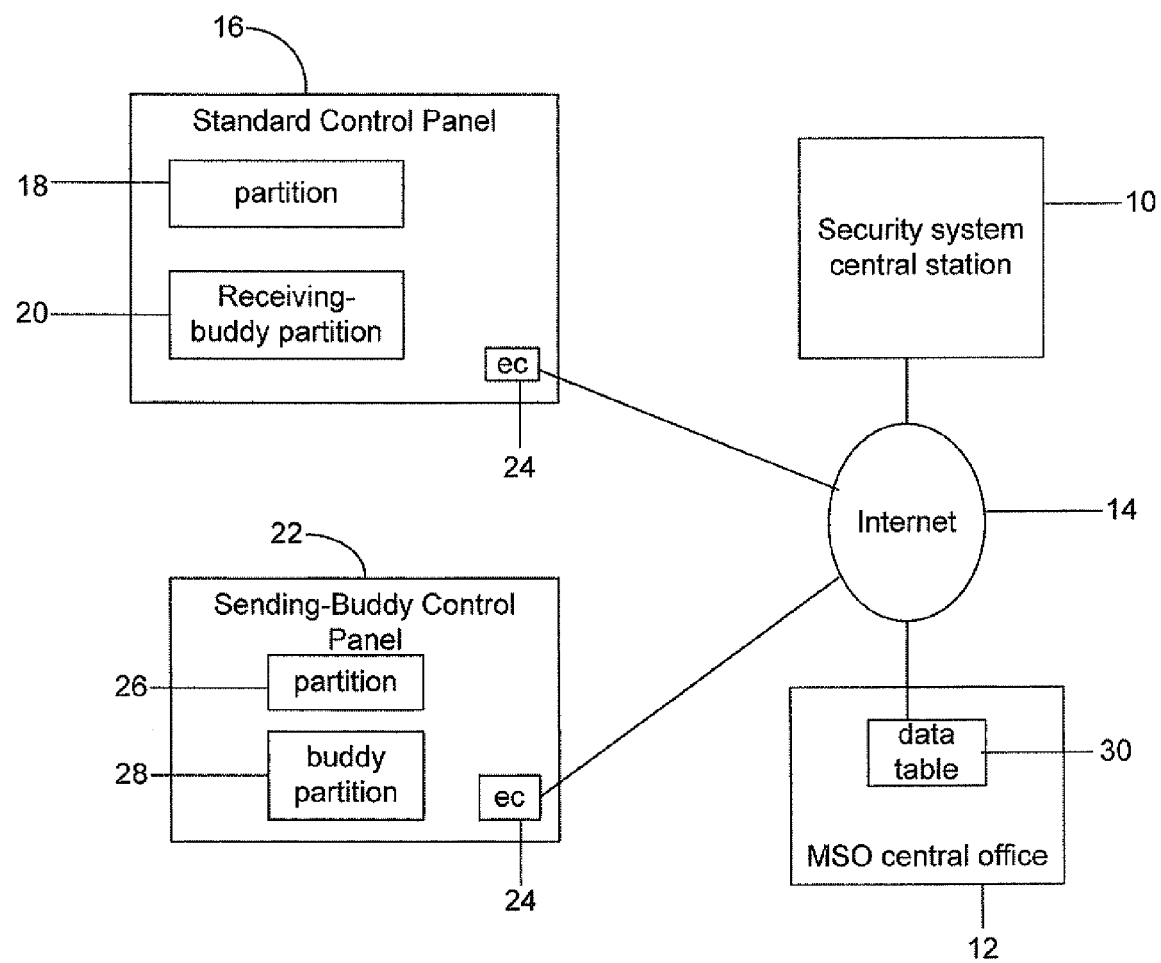
FIG. 1 is a block diagram of an embodiment of the present invention.

The present invention advantageously enables implementation of security "buddy" systems in which two discrete security systems can be linked or connected over the internet. FIG. 1 shows an exemplary embodiment of the present invention. A buddy security system links two separate security systems each of which communicates with a security system central monitoring station 10 and with an MSO central office 12. The two separate security systems are generally in two distinct physical locations. Communications between each security system and the central monitoring station 10 and the central office 12 occur over the internet 14 using the MSO's LAN.

In the inventive buddy security system, a first of the separate security systems has a standard control panel 16 with a general security partition 18 and a receiving-buddy partition 20. The buddy relationship is one in which the receiving-buddy partition 20 of the standard control panel 16 can view and remotely control its "buddy", that is, the sending-buddy control panel 22 of the separate, second security system. The standard control panel 16 can display information regarding its "buddy" and can also accept commands, such as arm and/or disarm commands, to manipulate the "buddy".

Based on this buddy relationship, when an alarm message, for example, is displayed on the sending-buddy control panel 22, the same alarm message is displayed on the standard control panel 16 via its receiving-buddy partition 20. Other messages are similarly displayed, along with sounds, such as alarm bells, if appropriate. Any and all text data, video and/or audio displayed on the sending-buddy control panel 22 can be displayed on the standard control panel 16 in accordance with the buddy relationship.

In addition, data entered into the standard control panel 16 can, for example, change the status of the sending-buddy control panel 22, so that the sending-buddy control panel's security system can be armed from the standard control panel 16.

The standard control panel 16 has Ethernet connectivity, such as an Ethernet card, Ethernet circuitry, wi-fi connection 24 for communicating over the internet 14. This control panel 16 has one or more partitions 18, including the receiving-buddy partition 20. While more than one partition 18 and/or more than one receiving-buddy partition 20 can exist for a standard control panel 16, for simplicity, only one of each is shown.

The sending-buddy control panel 22 of the second security system also has Ethernet connectivity 24 for communicating over the internet 14. As with the first security system, the second or buddy security system's sending-buddy control panel 22 can have one or more partitions 26 and one or more of these partitions can be buddy partitions 28; for simplicity, only one partition 26 and one buddy partition 28 is shown. Further, a buddy partition 28 is not required on the sending-buddy control panel 22.

A data table 30 containing IP addresses is maintained in real time in the MSO central office 12, to assign dynamic (DHCP) addresses of control panels 16, 22 to IP addresses. The data table 30 can be a centralized database of real time IP addresses. Correct address status, that is, the appropriate IP address, for connections to the security system central monitoring station 12 are also maintained in the data table 30. The real time connection over a broadband LAN allows the transmission of compressed video and audio, as well as of data, enabling the display of this information on the receiving-buddy partition 20.

Accordingly, real time status and management of buddy security systems on an MSO LAN can be maintained, allowing messages between such systems with dynamic IP addresses using a data table 30 of real time IP addresses, the data table 30 residing in the central office 12 of the MSO. In addition, the IP address data table 30 can be used to route security messages to the central monitoring station 12 as well as to external security companies, including other security companies on the MSO LAN or over the internet, such as over a wide area network (WAN).

In another embodiment, the MSO central office 12 can include features of the security system central station 10. In this embodiment, the control panels 16, 22 would communicate directly over the internet with the MSO central station 12 which would incorporate the functionality of a security system central station 10.

Examples of uses for the present invention include the following. For example, a business owner could buddy the security system in his store or business in conjunction with the security system in his house, so that his house system will display, on a partition of the home security control panel, any security issues or breaches that occur in his store, with the result that the issues are displayed in both the home and the store. In addition, if the business owner discovers, for example, that the store system was not armed, he or she can arm the system remotely from the "buddy" partition of his home security control panel.

In another example, an elderly individual having a security system in his house could buddy with a friend or neighbor, so that a breach in security in the elderly individual's house would not only appear on his security panel but also on a partition of the buddy's security panel. In yet another example, a parent at work could buddy with the security system in his home, enabling the parent to monitor the home not only for intruders and/or security breaches but also for activities of children at home without direct parental supervision. Other buddy systems between security systems can also be established.

Figure 2:
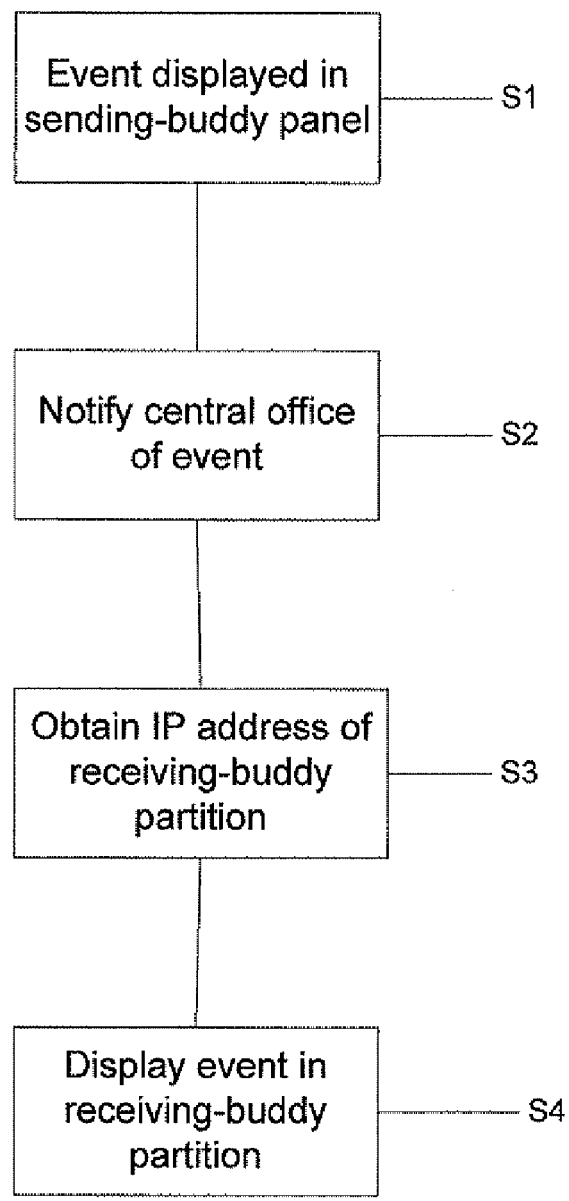
FIG. 2 is a flow diagram illustrating the steps for displaying an event in the present invention.
Figure 3:
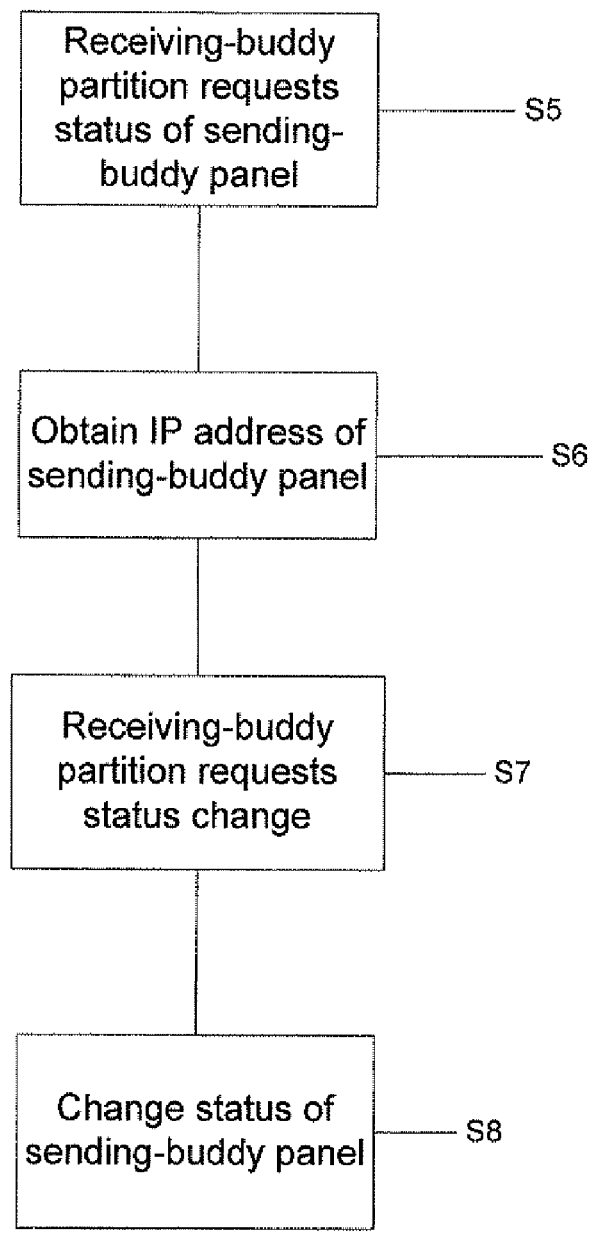
FIG. 3 is a flow diagram illustrating the steps for changing the status in the present invention.

Operation of the buddy security system is now described with reference to FIGS. 2 and 3 in accordance with the system shown in FIG. 1. It is assumed that a buddy security system is established between a receiving-buddy partition 20 in the standard control panel 16 of a first security system and a partition 28 in the sending-buddy control panel 22 of a second security system. FIG. 2 illustrates the steps for displaying an event in the second security system on the receiving-buddy partition 20 of the first security system. FIG. 3 illustrates the steps for controlling the second security system with the receiving-buddy partition 20 of the first security system.

In step S1, shown in FIG. 2, an event, such as an alarm, occurs in the second security system, and this event is displayed in the partition 28 in the sending-buddy control panel 22, that notifies the security system central monitoring station 10 of this occurrence in step S2. The monitoring station 10 accesses the data table 30 in the MSO central office 12 and obtains the dynamic IP address of the receiving-buddy partition 20 in step S3. In step S4, the event is displayed in real time on the receiving-buddy partition 20. If appropriate, the display can include audio and video as well as text data.

In step S5, shown in FIG. 3, a user at the receiving-buddy partition 20 requests the status of the sending-buddy control panel 22. This requires the IP address of the sending-buddy control panel 22. This dynamic IP address is obtained in step S6 from the data table 30 in the monitoring station 10 of the MSO central office 12. In step S7, using the dynamic IP address, the receiving-buddy partition 20 displays the sending-buddy control panel's status, and the user can enter a status change command, such as arm or disarm. The status of the sending-buddy control panel 22 is changed in real time in step S8.

In another embodiment, the occurrence of an event in the partition 28 in the sending-buddy control panel 22 could be routed to the MSO central office 12 where the dynamic IP addresses of the receiving-buddy partition 20 and the security system central monitoring station 10 can both be obtained. Then, the notification of the event could be transmitted simultaneously to both the receiving-buddy partition 20 and the monitoring station 10. In the alternative, the notification of the event could be transmitted to the receiving-buddy partition 20 and, if instructed by the receiving-buddy partition 20, then the notification could be transmitted to the monitoring station 10. This alternative enables the owner or user of the standard control panel 16 on the first security system to determine if the event is a false alarm and to prevent transmission to the monitoring station 10 of such false alarms.

The embodiments described above are illustrative examples and it should not be construed that the present invention is limited to these particular embodiments. Thus, various changes and modifications may be effected by one skilled in the art without departing from the spirit or scope of the invention as defined in the appended claims.

While the present invention has been described in particular embodiments, it should be appreciated that the present invention should not be construed as limited by such embodiments, but rather construed according to the claims below.

What is claimed is:

1. A buddy security system comprising:
   a security system central station;
   an MSO having an MSO LAN and a central office having a data table comprising a plurality of IP addresses;
   a standard control panel in a first security system, said standard control panel having a first IP address of said plurality of IP addresses and being operable to communicate with said central station and said central office via said MSO LAN; and
   a buddy control panel in a second security system distinct from the first security system, said buddy control panel having a second IP address of said plurality of IP addresses and operable to communicate with said central station and said central office via said MSO LAN,
   wherein the standard control panel and the buddy control panel communicate using the first and the second IP addresses obtained from the data table, and
   wherein when an event occurs in the second security system, the event is displayed on the buddy control panel and the event is displayed on the standard control panel using the first IP address obtained from the data table.

2. The system according to claim 1, wherein when the event occurs, the second security system notifies the central station of the event.

3. The system according to claim 1, wherein the event is displayed as at least one of audio, video, and text data.

4. The system according to claim 1, wherein the communication occurs in real time.

5. The system according to claim 1, wherein the standard control panel comprises a buddy partition operable to display an event.

6. The system according to claim 1, wherein the communication between the standard control panel enables the standard control panel to change a status of the buddy control panel.

7. The system according to claim 1, wherein the buddy control panel and the standard control panel have at least one of Ethernet cards, wi-fi connections, and Ethernet circuitry.

8. A method for implementing a buddy security system comprising:
   maintaining a data table comprising a plurality of IP addresses on an MSO having an MSO LAN and a central office;
   obtaining a first IP address of a partition of a standard control panel of a first security system from said data table;
   obtaining a second IP address of a buddy control panel of a second security system from said data table;
   communicating between said standard control panel and said buddy control panel using the first and the second IP addresses obtained from the data table; and
   displaying an event on the buddy control panel and on the standard control panel using the first IP address obtained from the data table when the event occurs in the second security system.

9. The method according to claim 8, wherein the step of communicating is at least one of displaying on the standard control panel an event from the buddy control panel and changing a status of the buddy control panel from the standard control panel.

10. The method according to claim 9, wherein the step of displaying the event on the standard control panel further comprises notifying a security system central station of the event.

11. The method according to claim 9, wherein the event is displayed as at least one of audio, video, and text data.

12. The method according to claim 8, wherein the step of communicating further comprises notifying a security system central station of an event.

13. The method according to claim 8, wherein the step of communicating is performed in real time.

14. The method according to claim 8, wherein the buddy control panel and the standard control panel have at least one of Ethernet cards, wi-fi connections, and Ethernet circuitry.

* * * * *